United States Patent
Merot et al.

(10) Patent No.: US 7,790,096 B2
(45) Date of Patent: Sep. 7, 2010

(54) THERMAL MANAGEMENT SYSTEM FOR A REMOVABLE BUILD CHAMBER FOR USE WITH A LASER SINTERING SYSTEM

(75) Inventors: Christian M. Merot, Mesa, CO (US); Tae Mark Chung, San Diego, CA (US); Raymond J. Bishop, Santa Clarita, CA (US)

(73) Assignee: 3D Systems, Inc., Rock Hill, SC (US)

( * ) Notice: Subject to any disclaimer, the term of this patent is extended or adjusted under 35 U.S.C. 154(b) by 1164 days.

(21) Appl. No.: 11/096,144

(22) Filed: Mar. 31, 2005

(65) Prior Publication Data

US 2006/0219671 A1 Oct. 5, 2006

(51) Int. Cl.
| | |
|---|---|
| B27N 5/00 | (2006.01) |
| B29C 35/08 | (2006.01) |
| B29C 41/02 | (2006.01) |
| B29C 41/52 | (2006.01) |

(52) U.S. Cl. .................................. 264/497; 264/40.6
(58) Field of Classification Search ................ 264/40.6, 264/497
See application file for complete search history.

(56) References Cited

U.S. PATENT DOCUMENTS

| | | | |
|---|---|---|---|
| 4,247,508 A | 1/1981 | Housholder | |
| 4,863,538 A | 9/1989 | Deckard | |
| 4,944,817 A | 7/1990 | Bourell et al. | |
| 5,132,143 A | 7/1992 | Deckard | |
| 5,622,577 A | 4/1997 | O'Connor et al. | |
| 5,658,412 A | 8/1997 | Retallick et al. | |
| 6,153,142 A * | 11/2000 | Chari et al. ............ | 264/40.6 X |
| 6,383,446 B1 * | 5/2002 | Tokita ........................ | 419/38 |
| 6,554,600 B1 | 4/2003 | Hofmann et al. | |
| 2003/0201255 A1 | 10/2003 | Manetsberger et al. | |
| 2003/0222066 A1 | 12/2003 | Low et al. | |
| 2006/0118532 A1 * | 6/2006 | Chung et al. ............ | 219/121.85 |

FOREIGN PATENT DOCUMENTS

EP   1 384 565 A   1/2004

OTHER PUBLICATIONS

U.S. Appl. No. 11/088,133, filed Mar. 23, 2005, "Apparatus and Method for Aligning a Removable Build Chamber Within a Process Chamber."

* cited by examiner

*Primary Examiner*—Leo B Tentoni
(74) *Attorney, Agent, or Firm*—Ralph D'Alessandro; Keith A. Roberson

(57) ABSTRACT

A thermal management system is provided to control the preheating and cool down of a removable build chamber in a laser sintering system. A thermal management station controls preheating of a removable build chamber to heat the chamber to a temperature at or near the operating temperature of the laser sintering system. After insertion into the laser sintering system and completion of a build the thermal management station controls the cool down of the part cake within the removable build chamber after the chamber has been removed from the laser sintering system.

5 Claims, 3 Drawing Sheets

Figure 1:
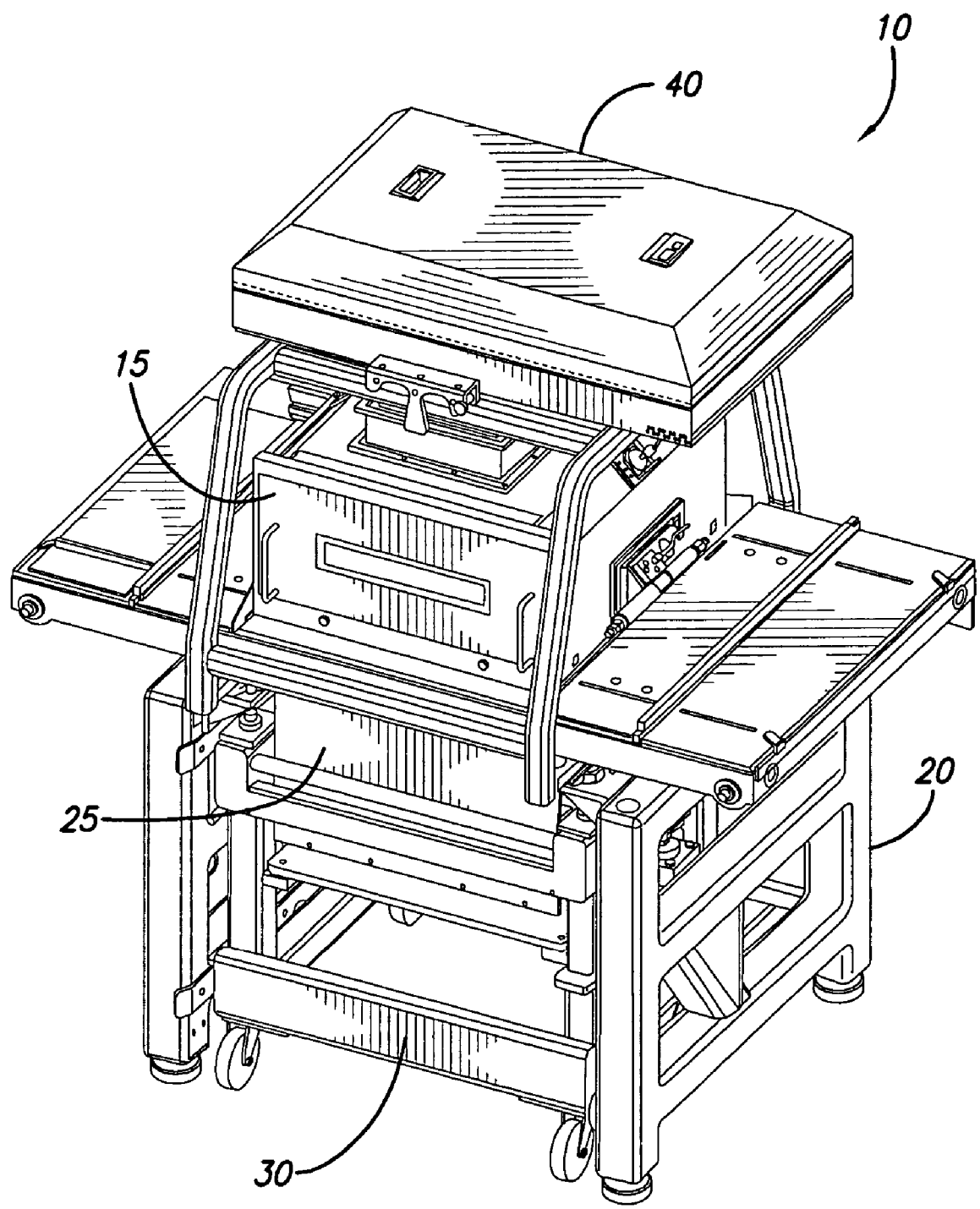

THERMAL MANAGEMENT SYSTEM FOR A REMOVABLE BUILD CHAMBER FOR USE WITH A LASER SINTERING SYSTEM

BACKGROUND OF THE INVENTION

The invention relates generally to a method of rapid prototyping and manufacturing and, more particularly, to laser sintering and the ability to more quickly turn around a laser sintering system after completion of a first part build to commence a subsequent build.

Rapid prototyping and manufacturing (RP&M) is the name given to a field of technologies that can be used to form three-dimensional objects rapidly and automatically from computer data representing the objects. In general, rapid prototyping and manufacturing techniques build three-dimensional objects, layer-by-layer, from a working medium utilizing sliced data sets representing cross-sections of the object to be formed. Typically an object representation is initially provided by a Computer Aided Design (CAD) system. RP&M techniques are sometimes referred to as solid imaging and include stereolithography, ink jet printing as applied to solid imaging, and laser sintering.

A laser sintering apparatus dispenses a thin layer of heat-fusible powder, often a fusible polymer powder, polymer coated metal, or ceramic, across a process chamber to create a bed of the powder. The laser sintering apparatus then applies thermal energy to melt those portions of the powder layer corresponding to a cross-section of the article being built in that powder layer. The article is formed within a mass of powder commonly referred to as the "part cake." Lasers typically supply the thermal energy through modulation and precise directional control to a targeted area of the powder layer. Conventional selective laser sintering systems, such as the Vanguard™ system available from 3D Systems, Inc., use carbon dioxide lasers and position the laser beam by way of galvanometer-driven mirrors that deflect the laser beam.

The part cake is supported on a moveable build platform upon which the bed of powder is disposed. After a powder layer is fused, the build platform moves downward by an incremental distance and the apparatus then dispenses across the powder bed an additional layer of powder onto the previously fused layer and repeats the process of melting and selective fusing of the powder in this next layer. Fused portions of later layers fuse to fused portions of previous layers as appropriate for the article, until the article is complete. These articles are sometimes referred to as "built parts." Each additional layer of powder is typically dispensed from a powder feed system that dispenses a measured amount of powder onto the powder bed. A powder spreader, such as a blade or roller then picks up and spreads the powder over the powder bed in a uniform manner.

Detailed descriptions of laser sintering technology may be found in U.S. Pat. Nos. 4,863,538; 5,132,143; and 4,944,817, all assigned to Board of Regents, The University of Texas System, and in U.S. Pat. No. 4,247,508 to Housholder.

Generally, once the part is built it remains within the process chamber under an inert atmosphere until the newly formed part has cooled. Cooling may require several hours or days, depending upon the size and number of parts being built in a single build. As a result, the laser sintering apparatus may be inactive during the cooling time, which may cause the apparatus to be unavailable for subsequent builds.

Laser sintering systems have been developed that include a removable build chamber in which the build platform may be disposed. The build chamber including the newly built part may be separated from the process chamber and the part can then be cooled in the build chamber. A fresh build chamber can then be placed into the process chamber so that a new part may be built. The build chamber must be positioned within the process chamber so that the powder bed and the build platform are properly aligned. Incorrect alignment of the powder spreader and the vertical travel of the build platform may result in the depositing of non-uniform powder layers and/or lateral misalignment on successive fused layers of powder. Building a part on an incorrectly aligned build platform may result in a defective part that may be unusable. Proper alignment of the build platform with the powder spreader may require a user to make many adjustments and measurements. The alignment process may result in lost time and inefficiencies in the RP&M process.

U.S. Pat. No. 6,554,600 describes a laser sintering apparatus having a container that is manually inserted into the apparatus by physically lifting it up and placing it into the interior of the apparatus. Once placed in the apparatus, the container is stationary until it is removed from the container. The container is supported by rails on opposing sidewalls that position the container and align it with a reciprocatable overhead hopper system having a blade attached to the bottom of the hopper opening to deliver and then spread the powder. The insertable container has four side walls and a moveable platform having a size that is equal to the internal cross-section of the apparatus. A lifting mechanism moves the platform up and down as needed. After a part has been built, a system operator must physically lift the container, including the part and any unsintered powder, out of the apparatus. Physically lifting the container may be undesirable because the container is heavy and the lifting process could cause the part to shift, resulting in damage to the part.

An additional problem is the delay incurred when using a removable container or build chamber with a laser sintering apparatus waiting for the build chamber to be heated up to the operating temperature after the removable component is inserted into the laser sintering apparatus. This waiting period is additional time when the laser sintering system is inactive before operation can commence.

Thus, there exists a need for a laser sintering apparatus and a rapid prototyping apparatus in general having a removable build chamber that can be detached from the laser sintering system and replaced with another build chamber at or near the laser sintering system's operating temperature to be able to quickly begin another build cycle without adversely affecting the parts created during the prior build cycle in the removed build chamber. These problems are solved in the design of the present invention.

BRIEF SUMMARY OF THE INVENTION

It is an aspect of the present invention that a laser sintering system having a removable build chamber is provided that after completion of a build, the build chamber may be removed from the process chamber, the part cake with the part is allowed to cool in the build chamber, and a new preheated build chamber is inserted into the laser sintering system.

It is another aspect of the present invention that a microprocessor controlled thermal management station is connectable to the replacement build chamber to control the preheating of the chamber so that the replacement build chamber is at or near the temperature required to commence a subsequent build as soon as it is removably inserted into the laser sintering system.

It is still another aspect of the present invention that a microprocessor controlled thermal management station is connectable to the removed build chamber following completion of a part build to control the cool down of the part cake with the built part therein.

It is a feature of the present invention that the microprocessor controlled thermal management station manages the ramping down of heat in the removed build chamber to permit the part cake with its unfused powder and its newly built part therein to cool down in a controlled fashion.

It is another feature of the present invention that the microprocessor controlled thermal management station manages the preheating of the replacement build chamber prior to its insertion into the laser sintering system to bring the build chamber to a temperature at or near the operating temperature of the laser sintering system to permit a new build to begin shortly after its insertion and connection to the process chamber in the laser sintering system.

It is an advantage of the present system that a laser sintering system can be turned around for quick changeover after completion of a build to start up of a new build.

It is another advantage of the present invention that a controlled cool down of the removed build chamber with the newly built part and the surrounding unfused powder forming the part cake is obtained so that thermal distortion does not occur in the newly built part.

These and other aspects, features and advantages are obtained by use of a thermal management station that controls the cool down of the removed build chamber with the part cake inside and the preheating of the replacement build chamber to permit quick changeover of a laser sintering system between a completed part build and the start of a new build.

BRIEF DESCRIPTION OF THE SEVERAL VIEWS OF THE DRAWING(S)

Figure 2:
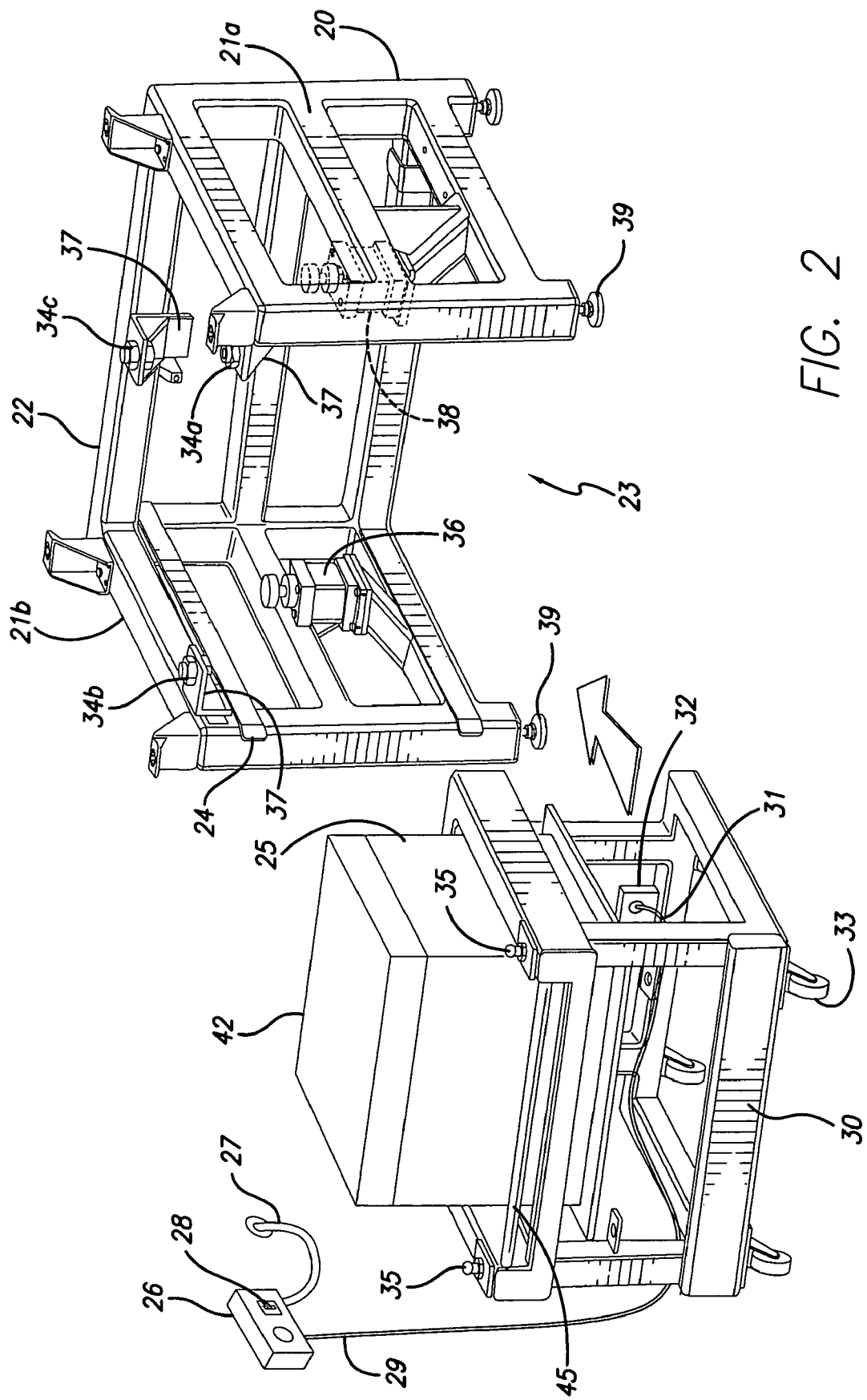
Figure 3:
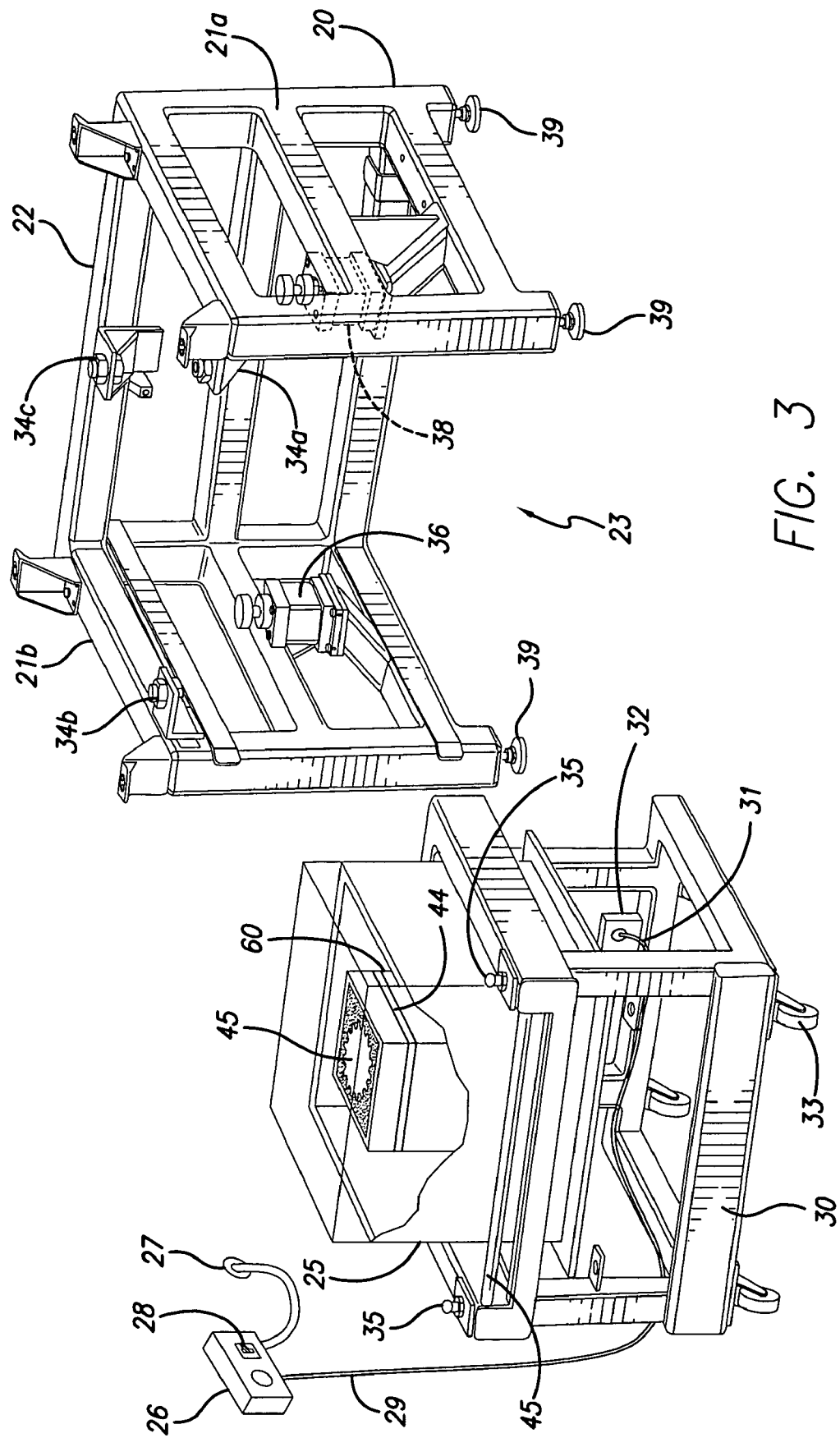

These and other aspects, features and advantages will become apparent upon consideration of the following detailed description of the invention, especially when taken in conjunction with the accompanying drawings wherein:

FIG. 1 is a graphical illustration of a laser sintering apparatus having a removable build chamber;

FIG. 2 is a graphical illustration of the preheating of the removable build chamber by its connection to the thermal control station controlling the heating prior to inserting the build chamber into the interior space of the support housing; and FIG. 3 is a graphical illustration of the build chamber with the newly built part removed from the support housing and connected to the thermal management station to control the cool down of the build chamber and the part cake with the newly built part and the unfused powder therein.

DETAILED DESCRIPTION OF THE INVENTION

The present invention now will be described more fully hereinafter with reference to the accompanying drawings in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIG. 1, a laser sintering apparatus or system having a removable build chamber is illustrated and broadly designated as reference number 10. The laser sintering system 10 includes a process chamber 15, an associated support housing 20, and a removable build chamber 25 that may be supported by a build carriage 30. The build carriage 30, along with the build chamber 25, may be removably inserted into the support housing 20. In some embodiments, the laser sintering apparatus 10 may include a lifting device (not shown in FIG. 1) that is adapted to move the build chamber 25 between a load position and a build position. As used herein, the term "build position" refers to the position of the build chamber 25 wherein the build platform is properly aligned with the powder bed such that vertical travel of the build platform is substantially perpendicular to the powder bed. In the build position the laser sintering apparatus 10 is ready to build parts. The lifting device can comprise hydraulic or pneumatic cylinders, electric motors, or the like. The laser sintering system 10 also includes an associated laser unit 40 that includes the laser and associated mechanisms for generating and targeting a laser beam within the process chamber 15.

The build chamber 25 may also include a plurality of alignment surfaces (not visible in FIG. 1) that are each adapted to releasably engage a corresponding surface on the support housing. As the build chamber 25 is moved into the build position, the alignment surfaces engage the corresponding surfaces on the support housing and position the build chamber so it is properly aligned with the process chamber. The design and operation of the removable build chamber is described in greater detail in co-pending U.S. patent application Ser. No. 11/088,133 filed Mar. 23, 2005 and assigned to the assignee of the present invention.

The process chamber 25 includes a powder bed (not shown) and an associated powder dispensing system having a powder feed hopper and a bottom feed mechanism (both also not shown). The process chamber 15 also includes a powder spreader preferably in the form of a counter-rotating roller (not shown) that is adapted to pick up and spread the dispensed powder over the powder bed in a uniform manner. The powder bed may include an opening which is adapted to removably receive build cylinder within build chamber 25. In the context of the invention, the term "powder spreader" includes rollers, wipers, doctor blades, or any other suitable device that may be used for spreading the powder across the powder bed in a uniform manner.

The build chamber 25 includes a build cylinder 60 (see briefly FIG. 3) having a moveable build platform (not shown). The process chamber 15 may also include one or more overflow receptacles (also not shown) that are adapted to receive any excess powder during the powder spreading operation. In operation, the powder spreader spreads the powder across the surface of the powder bed and deposits a discrete layer of powder onto the surface of the moveable build platform to form the part cake. As used herein, the term "part cake" refers to the layer(s) of heat-fusible powder, including the sintered powder and unfused powder, that has been deposited onto the surface of the build platform. The build platform may be controlled by a motor (not shown) to move downwardly below the powder bed in small incremental steps, for example 0.125 mm, to define the thickness of each layer of the powder to be processed. The motion is not limited to unidirectional, e.g. a downward motion of 0.500 mm followed by an upward motion of 0.375 mm will result in a final downward position that is 0.125 mm lower than the last step. Typically, the build platform is moveable within the build cylinder along an axis of vertical travel (not shown).

Preferably, the powder bed defines a horizontal plane that is substantially perpendicular to the vertical travel of the build platform in the build cylinder 60 when the build chamber 25 is properly positioned and aligned in the build position. As used herein, the term "vertical travel" refers to the movement of the build platform as it moves within the build cylinder 60. Proper alignment of the powder bed with the vertical travel of the build platform throughout the build cycle is necessary to ensure that the part is not distorted. For example, during a build operation, the dispensing system dispenses a measured amount of powder onto the powder bed. The powder spreader then traverses across the powder bed one or more times distributing a uniform layer of powder across the surface of the build platform to form the part cake. If the vertical travel of the build platform is not properly aligned with the surface of the powder bed or becomes improperly aligned, each resulting layer of fused powder deposited on the build platform may be off-set from the nominal or expected position of the layer. As a result, the dimensions of a part built thereon may be distorted, which may cause the part to be unusable.

To effect placement of the build chamber 25 within the laser sintering system 10 the build chamber 25 is moved upwardly in the direction of the process chamber 15. Continued upward movement of the build chamber 25 causes the alignment surfaces on both the build chamber 25 and the support housing 20 to contact each other and align the build platform with the powder bed and opening (not shown) in the powder bed. The process chamber 15 may also include a seal for creating a sealing relationship between the powder bed and the build cylinder 60 (see briefly FIG. 3). Typically, the seal comprises a heat resistant elastomeric material that is effective to prevent the powder from passing between the interface of the powder bed and the build cylinder 60. In some embodiments, the build chamber 25 may be moved between the load position and the build position along a horizontal path. In such an embodiment, the lateral movement of the build chamber 25 causes the alignment surfaces to contact each other and align the build platform with the powder bed.

Prior to the joining of the process chamber 15 and the build chamber 25, the removable build chamber 25 is preheated by being connected to the thermal management station 26 as seen in FIG. 2. Thermal management station 26 includes a microprocessor to control the preheating of the build chamber 25 to some temperature at or near the operating temperature of the laser sintering system 10 to reduce the time needed to commence a build when the removable build chamber 25 is inserted into the process chamber 15 of system 10. Power is supplied to the thermal management station 26 from a 220 volt power supply line 27 that is connected to an appropriate outlet. An On/Off switch 28 on the thermal management station 26 controls the flow of electricity to the unit. A power cord 29 couples to cord 31 on the build carriage 30 which connects to a control box 32 which controls the flow of electrical energy to the 3 or 4 band heaters 44 (only one of which is shown in FIG. 3) arrayed around the build cylinder 60 within the removable build chamber 25 and the heater attached to the piston heater (not shown). Band heaters 44 are arrayed vertically about the party cylinder 60 at about 30%, 60% and 90% of the height from the bottom to the top of cylinder 60, for example with a 3 band heater system.

The control box 32 contains circuit boards to provide feedback on the temperature readings indicative of the temperature about the periphery of the part cake within the build cylinder 60 provided by the 4 thermistors (not shown) on each band heater and thermistors on the piston heater, as well as feedback on current sensing information for each of the band heaters to identify whenever a band heater fails. One thermistor is positioned on each side of the build cylinder 60, although more or fewer thermistors can be used as needed. The control box 32 sends the data over a high speed serial link to the microprocessor in the thermal management station 26 which uses the information to control the supply of power to the heaters. During the preheat cycle, the power is supplied so as to heat up the removable build chamber 25 as quickly as possible to a temperature in the range of from about 130° C. to about 165° C. so the laser sintering system 10 can be put into operation as quickly as possible. During the cool down cycle, as reflected in FIG. 3, the thermal management station 26 uses the sensings from the thermistors to achieve a controlled cool down of the part cake to avoid curl and other thermal distortion in the built parts. During the cool down cycle, the microprocessor in thermal management station 26 "tickles" the heaters to selectively add small amounts of heat to the build chamber via the band heaters 44 and the piston heater to ensure the part cake does not cool down too quickly. Selected parameters are monitored and utilized in an algorithm to signal when to energize the resistance band heaters.

The parameters include the temperatures of each of the band heaters surrounding the cylinder 60 and the materials being used to form parts. Where there are three heater bands employed, for example, the top cylinder heater may be set to operate at about 150° C.±10° C. The middle band heater may be set to operate at about 120° C.±10, while the lower band can be set to operate at about 100° C.±10° C. The piston heater will operate in a range of from about 150° C.+10° C. to about 50° C., depending upon the length of the build. For a short build the temperature would be set to the nominal set point of 150° C. at the beginning of the build and then would be ramped down during cooling. For a very long build the temperature would initially be set at 150° C. and then ramp down to as low as possible of a temperature, potentially even 0° C., because of the height of the part cake formed during the build and the heat present within the part cake as a result of the laser sintering process. The ramping down of the temperature in the piston heater is a function of the length of time of the build. The temperature set points of the heaters will also be dependent upon the material being processed so that different temperature settings will be used for nylon 12, nylon 11 and glassed filled nylon materials. If a taller build cylinder 60 is employed a fourth heater band can be employed and the heater settings will appropriately be set.

A laser and its associated targeting mechanisms are shown mounted in a unit 40, as shown in FIG. 1, above the process chamber 15. The process chamber 15 maintains the appropriate temperature and atmospheric conditions for the fabrication of the part. The atmosphere typically comprises an inert atmosphere, such as nitrogen. The system also includes an associated computer system (not shown) that is configured to operate the laser and its associated optics system. Typically, the computer may be programmed with information indicative of the desired boundaries of a plurality of cross sections of the part to be produced.

After the process chamber 15 and build chamber 25 have been joined, a laser beam is generated by laser (both not shown), and aimed at the target surface or area by way of a scanning system (also not shown) that generally includes galvanometer-driven mirrors that deflect the laser beam. As used herein, the term "target area" refers to the top surface of the part cake. The laser and galvonmeter systems are normally isolated from the process chamber 15 by a laser window. In some embodiments, the process chamber 15 may also include one or more radiant heaters (not shown) that heat the part cake and an area of the powder bed adjacent to the part cake. The deflection and focal length of the laser beam may be controlled, in combination with modulation of the laser, to direct laser energy to those locations of the fusible powder layer corresponding to a cross-section of the part to be formed in that layer.

In one embodiment, the process chamber 15 includes a powder dispensing system comprising a single powder feed hopper with a bottom feed mechanism controlled by a motor (not shown) to control the amount of powder dropped onto the powder bed below. The feed mechanism may be of several types including, for example, a star feeder, an auger feeder, or a rotary drum feeder. In some embodiments, the powder dispensing system may comprise one or more feed pistons that are disposed within the build chamber. In this last embodiment, one or more feed piston(s) push up a measured amount of powder into the powder bed. Thereafter, the powder spreader picks up and spreads the powder over the powder bed and build platform in a uniform manner. In another alternative embodiment, the powder feed system may comprise a reciprocatable overhead hopper system having a blade attached to the bottom of the hopper opening to deliver and then spread the powder.

As previously stated, powder spreader preferably comprises a counter-rotating roller driven by a motor (not shown) that spreads powder from powder wave across the laser target area. In some embodiments, the powder spreader carries any residual powder not deposited on the target area into overflow mechanisms (not shown) that may be disposed at opposing ends of the process chamber 15. Although the use of a counter-rotating roller is preferred, the powder can be spread by other means including a wiper or doctor blade. In some embodiments, the powder spreader may comprise a leveling roller having a transverse axis that extends laterally across the surface of the roller. When the build chamber 25 is positioned in the build position, the plane defined by the travel of the powder spreader across the powder bed is substantially perpendicular to the vertical travel of the build platform. Substantially perpendicular as used herein means that the some deviation from 90 degrees is permitted provided that the dimensional accuracy of the part remains acceptable.

As discussed above, the build chamber 25 may include a moveable build carriage 30 and a plurality of alignment surfaces that are each adapted to releasably engage a corresponding surface on the support housing 20. In this regard, FIGS. 2 and 3 illustrate an apparatus having a plurality of alignment surfaces that are each adapted to releasably engage a corresponding surface disposed on the support housing 20. Each alignment surface and its corresponding counterpart are collectively referred to as an alignment pair. In the embodiment illustrated in FIGS. 2 and 3, the apparatus includes three alignment pairs which comprise a receivers designated as reference numbers 34a, 34b, and 34c and a corresponding tooling ball 35, only two of which are shown. In some embodiments, the apparatus may include three alignment pairs so that when the build chamber 25 is moved into the build position, the alignment pairs define a plane that in some embodiments may be substantially parallel to the plane defined by the surface of the powder bed. The use of three pairs of alignment surfaces is preferred because three points uniquely define a plane. However, it should be recognized that it may be possible to use more than three alignment pairs if care is taken to ensure that they are coplanar. It should also be recognized that in some embodiments, the alignment pairs may not define a plane that is substantially parallel to the plane of the powder bed provided that while in the build position, the powder bed is aligned with the axial travel of the build platform, as long as the axis of the build platform travel is substantially perpendicular to the plane of the powder bed.

During assembly of the laser sintering system 10, the positions of each of the alignment surfaces on the build chamber 25 are aligned with the build platform, and the positions of each of the corresponding surfaces on the support housing are aligned with the powder bed and powder spreader. As a result, when the build chamber 25 is moved upwardly towards the build position, the alignment pairs cause the position of the build chamber to shift so that the build chamber 25 and process chamber 15 have the correct horizontal and vertical alignment. In the context of the assembly process described, the term "horizontal alignment" refers to the front-to-back and side-to-side (i.e., X and Y directions) position of the build chamber 25 with respect to the process chamber 15. The build chamber 25 is considered to have the correct horizontal alignment when the build cylinder 60 is aligned with the opening in the powder bed into which it seats and a sealing relationship may be established therebetween. The term "vertical alignment" refers to the up and down (Z direction) movement of the build chamber 25 with respect to the process chamber 15. The build chamber 25 is considered to have the correct vertical alignment when travel of the build platform within the build cylinder 60 is substantially perpendicular to the plane of the powder bed. Correct vertical alignment is maintained throughout the build process so that as the build platform moves within the build cylinder 60, the travel of the build platform remains substantially perpendicular to the plane of the powder bed. In some embodiments, the travel of the build platform is substantially perpendicular to the transverse axis of the powder spreader, such as a leveling roller.

As seen in FIGS. 2 and 3, the support housing 20 may comprise a framed structure having opposing sidewalls 21a, 21b and a rear wall 22 that together define an interior space in the support housing. The support housing 20 may also include an opening 23 opposite the rear wall 22 through which the build carriage 30 may be removably inserted into the interior space. The support housing 20 may also include guide rails 24, only one of which is shown, that help direct the placement of the build carriage 30 within the support housing 20. In some embodiments, the support housing 20 may also include at least one lifting device that is adapted to move the build chamber 25 between a load position and a build position. In some embodiments, the support housing 20 includes two lifting devices 36, 38 for supporting and lifting the build carriage upwardly. Suitable lifting devices include hydraulic or pneumatic cylinders, electric motors and the like. In embodiments where the build chamber moves along a horizontal pathway, the lifting device may move the build chamber laterally between the load position and the build position. Leveling feet 39 may help an operator to properly align the level of the support housing 20 so that the build chamber 25 may be easily inserted into the interior space of the support housing.

In some embodiments, one or more of the alignment pairs of receivers with tooling balls comprise a projection that extends outwardly from the build carriage 30 and a corresponding recess disposed on the support housing 20 that is adapted to receive the projection. In this regard, at least one of the alignment pairs comprises an outwardly extending projection and a recess (both not shown) that is adapted to receive the projection therein. In some embodiments, each recess may be disposed in a receiver 34a, 34b, or 34c attached to the support housing 20. Here, the receivers 34a, 34b, and 34c are each shown as being supported by brackets 37 that extend inwardly from the sidewalls or the rear wall in the direction of the interior space. In FIGS. 2 and 3, the outwardly extending projections 35 are depicted in the form of a tooling ball. It should be recognized that other shapes and surfaces, such as a post, cylinder, block, or combinations thereof may be used provided that the build platform is properly aligned with the powder bed and the powder spreader when the build chamber 25 is in the build position. For the sake of simplicity, each alignment surface on the build carriage 30 will hereinafter be referred to as a "tooling ball." It should also be recognized that the orientation of the recess and the projection may be reversed.

Briefly, the alignment pair may comprise a tooling ball 35 and a receiver 34a, 34b, and 34c having a recess (not shown) that is adapted to releasably receive the tooling ball. In some embodiments, the receiver 34a, 34b, and 34c may also have a chamfer (not shown) at the opening of the recess. The chamfer comprises a beveled surface that allows for some initial misalignment between with build chamber 25 and the support housing 20. In this embodiment, each tooling ball 35 engages the chamfer on the corresponding recess as the build chamber is moved upwardly. Continued upward movement of the build chamber 25 causes the position of the build chamber to be shifted so that each tooling ball 35 is inserted into a recess and becomes seated. The tooling ball 35 may be seated against a base of the recess. In some embodiments, the tooling ball is seated when the top surface of the tooling ball contacts the base of the recess and further upward movement of the build chamber 25 is prevented. In some embodiments, the apparatus includes three alignment pairs that when fully seated define a plane that may be substantially parallel to the surface of the powder bed. The build chamber 25 on the support housing 20 is substantially parallel to this plane. As a result, when the tooling balls 35 are each seated within their respective recesses, the build platform is properly positioned and aligned with the powder spreader.

In some embodiments, the apparatus includes three alignment pairs that may be configured differently from each other in an orientation that helps facilitate proper alignment of the build chamber 25 and the process chamber 15 with minimal or no adjustment by a system operator. In one embodiment, a first alignment pair may comprise a recess that is slightly larger than the size of the tooling ball so that the tooling ball has minimal to no movement within the recess; a second alignment pair may be configured to limit horizontal movement of the tooling ball in a first direction while allowing more horizontal movement in a second direction that is perpendicular to the first direction; and a third alignment pair may have an oversized recess that allows the tooling ball to fit rather loosely within the recess and have some freedom to move laterally in all directions.

Referring again to FIG. 3, the first alignment pair receiver 34a and second alignment pair receiver 34b tooling balls may be attached to opposing side walls adjacent to the opening of the support housing 20, and the third alignment pair receiver 34c may be disposed on or in close proximity to the rear wall 22. The first and second alignment pairs receivers 34a and 34b may be positioned adjacent to the opening 23 of the support housing 20 so that their respective positions may be easily visualized by an operator positioning the build chamber 25 within the support housing 20. The third coupling is typically disposed near the rear wall because the oversize recess allows the tooling ball 35 to be easily aligned with the recess with little or no visualization. Typically, the third alignment pair receiver 34c functions along with the first and second alignment pair receivers 34a, 34b to define a horizontal plane to which the build chamber is substantially parallel and that is substantially parallel to the surface of the powder bed when the build chamber 25 is aligned in the correct vertical position.

Typically, the clearance between the tooling ball 35 and the sidewalls of the recess in receivers 34a, 34b and 34c is less than about 5 mils (1 mil=0.001 inches), and somewhat more typically is less than about 2 mils. Thus the clearance between the surface of the tooling ball 35 and the inner sidewall of a recess is very slight so that the tooling ball has little to no allowed lateral movement when seated in the recess. Rotation around tooling ball 35 of the first alignment pair in receiver 34a is prevented by the second alignment pair's tooling ball 35 and receiver 34b.

The second alignment pair of tooling ball 35 and receiver 34b may be configured to allow slight lateral movement in a first horizontal direction while limiting lateral movement in a second horizontal direction, as well as rotation around the first alignment pair. The second alignment pair receiver 34b may comprise a recess having an oblong or rectangular shape. In this embodiment, the recess will have a length that is greater than its width. The second alignment pair receiver 34b can have a clearance between the sidewall of the recess and the surface of the tooling ball 35 is relatively greater along its axial length. In this configuration, the tooling ball 35 has relatively more freedom to move back and forth along the axis while at the same time movement of the tooling ball in a direction perpendicular to the axis (its width) is relatively limited. Typically, alignment pair receiver 34b may be positioned on the support housing 20 so that the axis intersects alignment pair receiver 34a. In embodiments where alignment pair receiver 34a is positioned adjacent to the opening 23 (see briefly FIGS. 2 and 3) of the support housing, alignment pair receiver 34b may be positioned on the support housing 20 so that axis or the length of its recess is aligned with the opening 23 of the support housing 20 and is parallel to the rear wall 22. The oblong or rectangular shape of the recess in this configuration allows more freedom in positioning the build chamber 25 within the support housing 20. In combination, alignment pair receivers 34a, 34b position the build chamber 25 so that is locked in the horizontal plane (i.e., X and Y directions). As a result, alignment pair receivers 34a, 34b and their tooling balls 35 position the build chamber 25 so that the build platform becomes aligned with the opening of the powder bed as the build chamber 25 moves upwardly.

The third alignment pair receiver 34c can include an oversized recess (not shown) that allows the tooling ball 35 more freedom to move laterally in all directions. In this configuration the clearance between the sidewalls of the receiver 34c's recess and the surface of the tooling ball 35 is relatively larger in comparison to alignment pair receivers 34a and 34b. As discussed above, alignment pair receiver 34c may be positioned in or near the rear wall 22 to define a horizontal plane in conjunction with alignment pair receivers 34a and 34b. It should be recognized that the placement of alignment pair receivers 34a, 34b, and 34c on the support housing 20 may be varied depending on preference, provided that the axis of alignment pair receiver 34b intersects alignment pair receiver 34a.

In operation, the build chamber 25 is preheated by being connected to the thermal management station 26. Power is provided to the thermal management station 26 and relayed to the control box 32 via cords 29 and 31 to provide maximum energy to the band heaters 44 on the build chamber 25 and the piston heater to heat the build chamber to a temperature at or near the operating temperature of the laser sintering system 10. Once preheated, the electrical connections are disconnected and the build chamber 25, including the build carriage 30, is inserted into the interior of support housing 20 through opening 23. Guide rails 24 help to position and guide the build carriage 30 into the load position. The build carriage 30 may include one or more rollers 33 and a rail 45 or handles that may help an operator to move and reposition the build chamber 25.

Once the build chamber 25 has been inserted into the interior space of the support housing 20 and is in the load position, lifting devices 36, 38 then move upwardly and contact surfaces on the build carriage 30. The lifting devices 36, 38 then proceed to move the build chamber 25 upwardly in the direction of the process chamber 15. Each tooling ball 35 releasably engages a corresponding recess in its mated receiver 34a, 34b and 34c on the support housing 20. Each recess may include a chamfer that allows for some initial misalignment of the build chamber 25. Continued upward movement causes the tooling balls 35 to move upwardly along the chamfer and into the recesses of their alignment pair receivers. As a result, the build chamber 25 is eased into correct alignment with the process chamber 15. The build chamber 25 continues to move upwardly until each tooling ball 35 is seated in its corresponding recess, at which time upward movement of the build chamber 25 is prevented. The build chamber 25 is now in the build position. While in the build position, the build platform is horizontally and vertically aligned with powder bed and a sealing relationship exists between the build cylinder and the powder bed. A part may then be built as described above.

After completion of the part, the lifting devices 36, 38 move downwardly causing the build chamber 25 to separate from the process chamber 15 and move downwardly into the load position. A newly formed part 45 (or set of parts) is shown in the build cylinder 60 in FIG. 3. The build chamber 25 is then ready to be removed from the support housing 20 and connected to the thermal management system 26 via power cord 29. The process chamber 15 can now be used to build a second part(s) while the newly formed part 90 continues to cool in a controlled fashion in the removed build chamber 25. In some embodiments, it may be desirable to enclose the interior space of the build chamber 25 with a cover 42. The cover 42 may help facilitate cooling of the part(s) 45 at a controlled rate. The build chamber 25 may further include an insulating lining that also helps cool the part at a controlled rate. In some embodiments, the build chamber 25 and/or cover 42 further comprise radiant heaters and /or an inert gas supply that may further facilitate cooling of the part in a controlled environment, both of which are controlled by the thermal management station 26.

Having illustrated and described the principles of our invention in a preferred embodiment thereof, it should be readily apparent to those skilled in the art that the invention can be modified in arrangement and detail without departing from such principles. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. All patents and patent applications referenced herein are hereby specifically incorporated by reference in pertinent part.

Having thus described the invention, what is claimed is:

1. A method for controlling the temperature of a build chamber used in a laser sintering system comprising the steps of:
   a. connecting a first build chamber to a thermal management station to preheat the build chamber to a temperature at or near an operating temperature of the laser sintering system;
   b. disconnecting the build chamber from the thermal management station and inserting it into the laser sintering system;
   c. operating the laser sintering system to complete a build by forming at least one part in a part cake comprised of fused and unfused powder;
   d. removing the build chamber from the laser sintering system;
   e. connecting the removed build chamber to thermal management station; and
   f. controlling the cool down of the build chamber, by monitoring the temperature of the part cake at selected locations about the periphery of the part cake, to lower the temperature of the build chamber and the part cake to a temperature to permit breakout and removal of the at least one part in the part cake.

2. The method according to claim 1 further comprising preheating a replacement build chamber prior to removing the first build chamber from the laser sintering system.

3. The method according to claim 1 further comprising inserting the build chamber into a process chamber within the laser sintering system.

4. The method according to claim 1 further comprising controlling the cool down of the part cake by selectively supplying heat to the build chamber to controllably lower the temperature of the part cake and the at least one part therein to prevent thermal distortion in the at least one part.

5. The method according to claim 1 further comprising monitoring the temperature of the part cake via thermistors in heater bands arranged about a build cylinder containing the part cake within the build chamber.

* * * * *